3,809,773
METHOD FOR PREPARING A LIQUID IRON-FORTIFYING COMPOSITION

George N. Bookwalter, Peoria, Ill., assignor to the United States of America as represented by the Secretary of Agriculture
No Drawing. Filed Feb. 25, 1972, Ser. No. 229,581
Int. Cl. A23l 1/30
U.S. Cl. 426—380
4 Claims

ABSTRACT OF THE DISCLOSURE

A method for preparing highly stable, liquid, iron-fortifying compositions containing up to 1 percent by weight of ferrous or ferric ions. An aseptic and deaerated aqueous solution of an iron salt is prepared and blended with a high D.E. corn syrup. Food products such as baby formulas, bread and fruit drinks may be iron-supplemented with the iron-fortifying compositions.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to the preparation of stable liquid iron compositions which can be used to increase the iron content of food products.

The Food and Nutrition Board of the National Academy of Science has set the recommended dietary allowance of iron at 18 mg. per day—an amount so great that it cannot be supplied by existing foods without increased iron fortification. For instance, in bread the present standards require 13.0 to 16.5 mg. iron per pound of flour, and it has been proposed by the baking industry that this should be increased to 50 to 60 mg. iron per pound of flour (Federal Register, Apr. 1, 1970). The Commissioner of the Food and Drug Administration has proposed 40 mg. iron per pound of flour (Dec. 3, 1971).

Among the best sources if iron for food uses are salts such as ferrous sulfate, ferric ammonium citrate, ferrous fumarate, ferric choline citrate, and ferrous gluconate. Commercial preparations of these compounds include the relatively insoluble $FeSO_4 \cdot 1.2H_2O$ (32.1 percent Fe). When the ferrous sulfate compound is combined with wheat flour, off flavors develop during storage. Therefore, it is usually added during the baking process at the dough mixing stage in tablet form. The tablets, added at the rate of one per 100 pounds of flour, are broken up by hand which causes some doubt as to the completeness of distribution. This method is not easily adaptable to automation.

For baking and other food processing, a liquid iron composition would have great advantages. However, present commercial liquid preparations are not particularly suitable for food uses. One, for example (U.S. 2,822,317), combines a nontoxic ferrous salt with a polyhydric alcohol, 1-ascorbic acid, and sometimes ethyl alcohol to maintain the iron salt in an aqueous solution. These relatively expensive compositions are pharmaceutical preparations for treating hypochromic anemias and are not intended for general food use. They are usually a dark amber color which indicates that part of the soluble iron has reacted with dissociated hydroxy ions from the water. The solutions must be stored in dark amber bottles in a cool place to prevent further degradation.

Water solutions of iron salts such as ferric ammonium citrate, ferric choline citrate, or ferrous gluconate are fairly stable but are quite highly colored. Water solutions of ferrous sulfate, on the other hand, are substantially lighter in color but much less stable. Iron rapidly comes out of these ferrous sulfate solutions in the form of an insoluble red precipitate.

An object of this invention is the provision of a highly stable preferably lightly colored iron solution in a form convenient for addition to a variety of food products.

In accordance with the above objects, I have discovered a method of preparing highly stable liquid iron-fortifying compositions which comprises first preparing aseptic aqueous solutions of ferrous or ferric salts and completely blending the resulting solution with a high conversion corn syrup optionally containing up to 40 percent sucrose based on total weight of solids under aseptic conditions. The ferrous or ferric salts, syrup, and water are blended in proportions such that the resulting compositions contain up to about 1 percent by weight ferrous or ferric ions, from about 70 percent to about 80 percent by weight total solids, the remainder being water. Stability is defined herein as being able to withstand ordinary storage and use conditions without loss of dissolved iron and without occurrence of fermentative reactions (i.e., biological stability).

Compositions prepared according to the above method have the advantage of being in an easy-to-use liquid form which lends itself to automation. High conversion corn syrups or their equivalents are essential ingredients in a wide variety of food preparations including baked goods, confections, beverages, jams, jellies, and fountain syrups. However, iron salts are normally difficult to dissolve in syrups, and in mixing large batches it is very difficult to determine when the salts are completely dissolved. The instant method provides quick mixing and assurance of complete solution.

When the liquid iron-fortifying composition contains ferrous sulfate heptahydrate as the iron-fortifying agent, it has the further advantage of being substantially colorless. This is a great advantage in certain food products such as baked goods where off colors are objectionable to consumers.

DETAILED DESCRIPTION OF THE INVENTION

Iron salts useful in preparing liquid iron-fortifying compositions must be water-soluble and nontoxic at addition levels described herein and include ferric ammonium citrate, ferric choline citrate, ferrous gluconate, and ferrous sulfate. Any iron salt within the above limits will be considered equivalent for the purpose of the invention. Ferrous sulfate heptahydrate ($FeSO_4 \cdot 7H_2O$) is preferred primarily because it provides compositions which range from colorless (compositions containing up to 0.1 percent ferrous ions) to very slightly blue (compositions containing 0.1 to 1.0 percent ferrous ions) while other ferrous or ferric salts produce compositions which range from medium to dark amber. These amber colors are easily detected in food products which are not themselves highly colored.

Ferrous sulfate is preferred also because it is the least expensive source of iron for physiological purposes.

High conversion corn syrup is defined herein as a syrup made by the partial acid hydrolysis of corn starch and having a dextrose equivalent (DE) of from about 60 to about 68 and a solids content of about 80 percent by weight ("The Encyclopedia of Chemical Technology," Kirk and Ottman editors, 2nd edition, vol 6, pp. 926–932). An extra high conversion corn syrup having a DE of 70 was also used to prepare the instant compositions and is considered for the purpose of this invention equivalent to the high conversion syrup described above.

Simply mixing together the desired amounts of iron salts, high conversion corn syrup, and water does not produce a stable liquid iron-fortified composition. Prepared in this manner, compositions quickly darken due to precipitated iron. However, iron will not precipitate when prepared according to the following procedure. All the process steps and storage should be conducted under aseptic conditions to insure biological stability of the products. The preferred manner of achieving this stability is described for each step. However, those skilled in the art will be aware of many other equivalent methods.

The first step of the process is the preparation of an aqueous solution of ferrous or ferric salts. It is preferred that the water be boiled before dissolving the iron salts to provide an aseptic solution. When ferrous salts are used, boiled deaerated water cooled to about 70° to 90° F. eliminates clouding of the resulting solution, probably caused by oxidation of the ferrous ion. Clear solutions containing up to 26 percent by weight $FeSO_4 \cdot 7H_2O$ can be prepared in this manner. The concentration of iron in these solutions is varied in accordance with the amounts of iron and water desired in the final composition. Final compositions containing more than 30 percent water by weight tend to be biologically unstable, and at this water content any dissolved ferrous or ferric ions over about 1 percent by weight of the final composition will tend to precipitate. The concentration of ferrous or ferric ions in the examples has been calculated from the total amount of iron salt in solution. It is possible that all dissolved iron is not in free ionic form, but could be bound in some manner to the anion or to other compounds present in the composition. However, this is not important for nutritional purposes. Concentrations of iron described herein in terms of weight percent of ferrous or ferric ions will be understood to include all iron contained in the added salt.

A small amount of acid can be added, preferably to the aqueous iron solution, to bring the acidity of the final composition down to about pH 2. In some cases where the composition is used or stored under drastic conditions, such as high temperatures (e.g., 120° F.), stability is decreased. Adjusting the pH downward to about 2 will maintain stability. Without addition of acid a composition containing 1 percent ferrous ions will have a pH of about 3.5.

After the aqueous iron solution has been prepared, it should immediately be mixed with the syrup. Immediately is defined herein as the length of time before the occurrence of clouding of the iron solution. This can be as long as 1 hour. The preferred temperature range for the syrup during the mixing step is from about 65° to about 300° F. Viscosity noticeably increases at temperatures below 65° F., and the syrup begins to discolor at temperatures of about 300° F. To maintain aseptic conditions, it is preferred that the syrup to which the iron solution is added be at a temperature of from about 180° to about 200° F.

The syrup can be all high conversion corn syrup or it can contain up to 40 percent sucrose, based on total solids weight. Sucrose solutions can be prepared which have up to 67 percent solids and 33 percent water. When ferrous sulfate is dissolved in this solution, a black precipitate forms which changes to red on standing. A similar precipitate forms when ferrous sulfate is dissolved in high conversion corn syrup containing less than 70 percent solids. It is, therefore, believed that the precipitation of the ferrous salts which occurs in blends containing less than 70 percent solids is due to excessive amounts of water. Stable liquid iron-fortified compositions can be prepared according to the invention that contain 70 percent by weight solids consisting of 40 percent sucrose and 60 percent high conversion corn syrup solids, and that also contain up to 1 percent ferrous ions. Dextrose can also be added in the same manner as sucrose but in smaller amounts since the maximum amount of solids in a dextrose solution is only 50 percent by weight. While the lower limit of solids content in the liquid iron-fortified composition is preferably 70 percent by weight, stable compositions can be prepared which contain as high as 80 percent by weight solids.

To insure a final composition that maintains biological stability under storage and use conditions, it should be transferred after preparation, preferably at a temperature of at least 180° to 200° F. into sterilized containers. In the laboratory these containers consisted of clear glass pint bottles which were tightly screw-capped and inverted.

Compositions containing ferrous sulfate are colorless even when the most concentrated ferrous sulfate solutions were used. The slightly blue color of the iron solutions is not detected in the final product. All final products are stable during storage and in food processing at temperatures of 0° to 100° F. in darkness or direct sunlight. They may be frozen for extended periods of time without loss of stability or functional properties. Good flavors, physical stabilities, and biological stabilities were maintained after storage for 1 year at room temperature. A slight yellowing occurred to the same extent in both the instant compositions containing ferrous sulfate and samples of nonformulated high conversion corn syrup, but for all purposes for which these compositions are intended they are considered to be essentially colorless.

The following embodiments are intended to further describe the invention which is defined only by the claims.

EXAMPLES 1–4

Aqueous iron solutions were prepared by mechanically mixing for about 10 minutes a ferrous or ferric salt in distilled water which had previously boiled (to deaerate and make aseptic) and cooled to between 70° and 90° F. At this point a mineral acid was added to some of the solutions to lower the pH of the final composition.

The iron solutions were then added by means of a funnel having its exit end protruding beneath the surface of the liquid to a syrup which had been previously heated to between 180° and 200° F. During the addition and for about 10 to 30 seconds after all the iron solution had been added, the syrups were mechanically stirred to insure complete mixing. The compositions, still at a temperature of 180° to 200°, were transferred to clear glass pint bottles which were then screw-capped and inverted to eliminate fermentation during storage.

Amounts and kinds of starting materials and final products for several composition preparations are described in Table 1.

TABLE 1

| | Examples | | | |
|---|---|---|---|---|
| | 1 | 2 | 3 | 4 |
| Starting material, g.: | | | | |
| High conversion corn syrup DE 65, 82% solids by weight | 3,619 | 3,570 | 3,938 | 3,938 |
| Sucrose | 524 | 523 | 0 | 0 |
| $FeSO_4 \cdot 7H_2O$ solution: | | | | |
| Salt | 3.5 | 164.5 | 230 | 207 |
| Deaerated distilled water | 100 | 400 | 380 | 360 |
| Water | 412 | 115 | 0 | 0 |
| Acid (1 N HCl) | 0 | 0 | 0 | 20 |
| Final composition: | | | | |
| Total solids content, wt. percent | 75.5 | 74.9 | 75.4 | 75.1 |
| Ferrous ion, wt. percent [1] | 0.015 | 0.69 | 1.01 | 0.92 |
| Water, wt. percent | Remainder | | | |
| pH | 5.0 | 3.1 | 3.6 | 2.3 |

[1] Calculated from total amount of iron salt added.

All compositions were colorless and were stable at least 1 year at room temperature (70° F.). At storage temperatures of 120° F., Examples 1–3 showed a tendency to discolor indicating some unstability. Example 4, on the other hand, showed complete stability at that temperature.

EXAMPLE 5

An iron-fortifying composition was prepared as in Example 1–4 with 3690 g. of regular corn syrup (DE 42, 82 percent by weight solids), 524 g. sucrose, 341 g. water, and a ferric ammonium citrate solution containing 4.1 g. iron salt and 100 g. deaerated distilled water. The product was amber in color, contained 0.015 percent by weight ferric ion, 76.4 percent by weight total solids, and had a pH of 5.8.

EXAMPLE 6

An iron-fortifying composition was prepared as in Examples 1–4 with 3690 g. of regular corn syrup (DE 42, 82 percent by weight solids), 524 g. sucrose, 341 g. water, and a ferric choline citrate solution containing 5.8 g. iron salt and 100 g. deaerated distilled water. The product was dark amber in color, contained 0.015 percent by weight ferric ion, 76.2 percent by weight total solids, and had a pH of 5.0.

EXAMPLES 7–10

The following four compositions were prepared as in Examples 1–4 with a DE 70 corn syrup as shown in Table 2.

TABLE 2

|  | Examples | | | |
|---|---|---|---|---|
|  | 7 | 8 | 9 | 10 |
| Starting material, g.: | | | | |
| Extra high conversion corn syrup DE 70, 82% solids by weight | 3,600 | 3,100 | 4,000 | 4,000 |
| Sucrose | 522 | 850 | 0 | 0 |
| FeSO$_4 \cdot$7H$_2$O solution: | | | | |
| Salt | 206 | 201 | 194 | 202 |
| Deaerated distilled water | 380 | 380 | 386 | 380 |
| Water | | | Remainder | |
| Final composition: | | | | |
| Total solids content, wt. percent | 75 | 75 | 75 | 72 |
| Ferrous ion, wt. percent [1] | 0.85 | 0.85 | 0.85 | 0.85 |
| Water, wt. percent | | | Remainder | |
| pH | 3.2 | 3.2 | 3.3 | 3.2 |

[1] See footnote 1, Table 1.

EXAMPLE 11

Liquid iron-fortifying composition of Example 1 was utilized in the iron fortification of an infant baby formula. The baby formula prepared was as follows:

Baby formula: G.
- Carnation evaporated milk _____ 282
- Water _____ 370
- Liquid iron fortification composition (from Example 1) (30 ml.) _____ 42

Total _____ 694

The iron preparation was blended with water which had been heated to 125° F. and then blended with the evaporated milk. The mixture was added to baby bottles which were placed in a sterilizer and cooked for 25 minutes along with identically prepared unfortified baby formula. The bottles were cooled and stored in a refrigerator as would be done in usual practice. Appearance, flavor, and iron content (2.2 mg. Fe/bottle) were superior to the unfortified baby formula.

EXAMPLE 12

Liquid iron-fortifying composition of Example 2 was utilized in the iron fortification of sponge-dough bread. The procedure followed standard baking practice. The bread formulation was as follows:

Bread:sponge formula: G.
- Wheat flour _____ 420
- Water _____ 268
- Yeast, compressed _____ 14
- Yeast food _____ 3.5

Dough formula
- Wheat flour _____ 280
- Water _____ 174
- Liquid iron fortification composition (from Example 2) (11.5 ml.) _____ 16.2
- Salt _____ 14
- Dextrose hydrate _____ 28.7
- Nonfat dry milk _____ 21
- Vegetable shortening _____ 21

Total _____ 1,260.4

(The sponge formula was fermented 4½ hours and the ingredients of the dough formula were incorporated.)

The dough properties, flavor, color, and general baking characteristics of the bread containing liquid iron-fortifying composition (72 mg. Fe/pound flour) were similar to bread containing the more cumbersome dried FeSO$_4 \cdot$1.2H$_2$O and to unfortified bread. Present standards require 13.0 to 16.5 mg. Fe/pound flour and proposals of up to 60 mg. Fe/pound flour have been made.

EXAMPLE 13

Liquid iron-fortifying composition of Example 3 was utilized in the iron fortification of an orange-pineapple drink. The formulation was as follows:

Orange-pineapple drink: G.
- High conversion corn syrup _____ 123
- Sugar _____ 328
- Sodium citrate _____ 4.7
- Citric acid _____ 4.7
- Water _____ 2,515
- Orange juice (reconstituted) _____ 268
- Pineapple juice _____ 105
- Orange oil _____ 0.5
- Tween 60 _____ 0.5
- McCormick F.D.&C. red color (liquid) __ 0.4
- McCormick F.D.&C. yellow color (liquid) _ 0.2
- Liquid iron fortification composition (from Example 3) (4.4 ml.) _____ 6.2

Total _____ 3,356.2

The fortified orange-pineapple drink (10 mg. Fe/quart) was prepared by combining all ingredients except the liquid iron fortification composition and heating to 200° F. The iron preparation was poured in, blended, and the bottles were filled and capped at 190° F. Comparisons revealed no flavor or color differences between orange-pineapple drink with or without iron.

I claim:

1. A method of preparing highly stable, liquid, iron-fortifying compositions which comprises first preparing aseptic aqueous solutions of ferrous or ferric salts, and completely blending the resulting solution with a high conversion corn syrup optionally containing up to 40 percent sucrose, based on total weight of solids, under aseptic conditions, said ferrous or ferric salts, syrup, and water being blended in proportions such that the resulting compositions contain up to about 1 percent by weight ferrous or ferric ions, from about 70 percent to about 80 percent by weight total solids, the remainder being water.

2. The method of claim 1 in which the ferric salt is ferric ammonium citrate.

3. The method of claim 1 in which the ferric salt is ferric choline citrate.

4. The method of claim 1 in which the ferrous salt is ferrous sulfate heptahydrate and is first dissolved in aseptic, deaerated water at from about 70° to about 90° F. immediately after which the resulting solution is completely blended with a high conversion corn syrup optionally containing up to 40 percent sucrose, based on total weight of solids, under aseptic conditions, the resulting composition having a pH of from 2 to 5.

References Cited

UNITED STATES PATENTS

| 2,985,559 | 5/1961 | Coles | 424—295 |
| 3,692,542 | 9/1972 | Walon | 99—142 |
| 3,668,007 | 6/1972 | Egger et al. | 99—142 |
| 2,822,317 | 2/1958 | Gulesich et al. | 424—147 |
| 3,344,027 | 9/1967 | Hughes | 424—295 |
| 2,939,820 | 6/1960 | Gerber et al. | 424—295 |

(Other references on following page)

UNITED STATES PATENTS

| | | | |
|---|---|---|---|
| 3,607,310 | 9/1971 | Carter | 99—11 |
| 3,689,641 | 9/1972 | Spangler et al. | 99—28 |
| 3,491,187 | 1/1970 | Ely | 424—147 |
| 2,820,740 | 1/1958 | London et al. | 424—147 |
| 3,734,742 | 5/1973 | Morse et al. | 99—28 |

OTHER REFERENCES

National Academy of Sciences, Chem. Used In Food Processing, 1965, p. 58 (Copy available Gr. 170 U.S. Pat. Off.).

Remington's Pharmaceutical Sciences, 13th ed., 1965, pp. 902–905 (Copy available Chem. Lab. U.S. Pat. Off.).

MORRIS O. WOLK, Primary Examiner

S. MARANTZ, Assistant Examiner

U.S. Cl. X.R.

127—29; 424—147, 295; 426—213, 218